United States Patent [19]

Hilfman

[11] 4,121,996
[45] Oct. 24, 1978

[54] HYDROCRACKING PROCESS FOR THE PRODUCTION OF LPG

[75] Inventor: Lee Hilfman, Mt. Prospect, Ill.

[73] Assignee: UOP Inc., Des Plaines, Ill.

[21] Appl. No.: 838,268

[22] Filed: Sep. 30, 1977

[51] Int. Cl.$^2$ .................... C07C 3/42; C10G 13/08; B01J 29/22

[52] U.S. Cl. .................... 208/111; 252/439; 252/441; 252/455 Z; 260/676 R

[58] Field of Search .................... 208/111, 15

[56] References Cited

U.S. PATENT DOCUMENTS

| | | | |
|---|---|---|---|
| 3,821,105 | 6/1974 | Mitsche et al. | 208/139 |
| 3,847,796 | 11/1974 | Hilfman et al. | 208/111 |
| 3,953,320 | 4/1976 | Peck et al. | 208/111 |

Primary Examiner—Delbert E. Gantz
Assistant Examiner—G. E. Schmitkons
Attorney, Agent, or Firm—James R. Hoatson, Jr.; John G. Cutts, Jr.; William H. Page, II

[57] ABSTRACT

Hydrocarbons are converted with a catalyst comprising a Group VIII metal component combined with an extruded support containing alumina and mordenite. Key feature of the process involves the critical quantities of mordenite and alumina present in the composition, thereby effecting and maximizing some basic enhancement of the ability of the resultant catalyst to accelerate hydrocarbon conversion reactions that depend on carbonium ion intermediates; i.e., the activity level of the resultant composite is markedly increased. The aforementioned critical quantities of alumina are about 15 to about 40 weight percent and that of mordenite are about 85 to about 60 weight percent, wherein both are calculated on the basis of the total weight of the carrier material.

6 Claims, 1 Drawing Figure

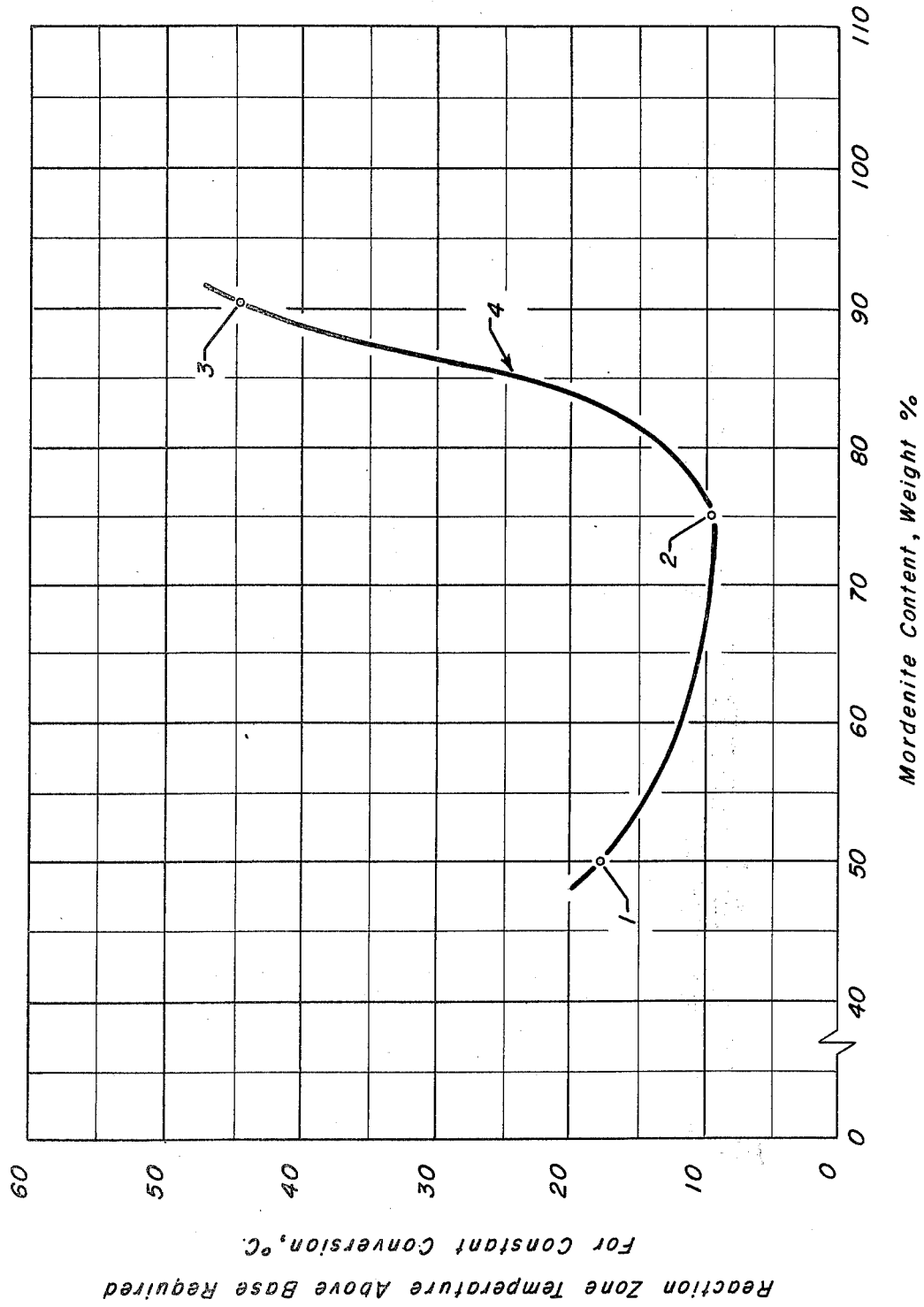

HYDROCRACKING PROCESS FOR THE PRODUCTION OF LPG

The invention encompassed by the present application relates to a hydrogen-consuming process for selectively producing LPG from a hydrocarbon charge stock boiling below 600° F. Hydrocracking processes are commonly employed for the conversion of heavier hydrocarbons into lower boiling saturated products. Economically successful LPG hydrocracking processes must be selective in order to avoid the decomposition of normally liquid hydrocarbons into undesirable gaseous hydrocarbons such as methane and ethane while maintaining a high activity for extended periods of time. The present invention utilizes a catalytic composite comprising a Group VIII metal component combined with an extruded mordenite carrier material containing a uniform distribution of about 15 to about 40 weight percent of finely divided alumina particles and about 85 to about 60 weight percent mordenite calculated on the basis of the total weight of the entire carrier material.

Solid catalysts having a propensity to accelerate so-called acid-catalyzed reactions are widely used today in hydrocracking processes. In many applications these catalysts are used by themselves to accelerate the reactions which mechanically are thought to proceed by carbonium ion intermediates. In other applications these acidic catalysts are combined with a hydrogenation-dehydrogenation metallic component to form a dual-function catalyst having both a cracking function and a hydrogenation-dehydrogenation function. In this latter case, the cracking function is generally thought to be associated with an acid-acting material of the porous, adsorptive, refractory oxidetype which is typically utilized as the support or carrier for a heavy metal component such as the metals or compounds of metals of Group VI or Group VIII of the Periodic Table to which the hydrogenation-dehydrogenation function is generally attributed.

In order to effect an acceptable, economically feasible hydrocracking process, the prior art proposes to combine crystalline aluminosilicates with an alumina material to produce a catalyst having an acidic function which is substantially greater than the sum of the acidity contributed by the alumina alone and the crystalline aluminosilicate alone.

The primary objective of the present invention is to provide an improvement in the process for selectively producing LPG from a hydrocarbon charge stock boiling below 600° F. As hereinafter indicated by specific example, the improvement resides in the chemical character of the catalytic composites which may be used in the catalytic reaction zone. The use of the improvement of the present invention results in a process which exhibits an increased activity without sacrificing the selectivity of the catalyst to produce LPG. A related object is, therefore, to provide a process which functions economically for an extended period of time as a result of the increased efficiency arising through the use of the improved catalytic composite.

Therefore, in a broad embodiment, the present invention relates to an improvement in a hydrogen-consuming process for selectively producing LPG from a hydrocarbon charge stock boiling below about 600° F., which comprises contacting said charge stock and hydrogen with a catalyst comprising a Group VIII metal component combined with an extruded mordenite-alumina carrier material containing a uniform distribution of about 15 to about 40 weight percent of finely divided alumina particles, said mordenite having been treated to reduce the sodium content to less than about 5 weight percent $Na_2O$ and subsequently having been treated with an aqueous ammoniacal solution at a pH of at least about 9.5, at hydrocracking conditions including a pressure of about 300 to about 1800 psig., a temperature of about 600° F. to about 850° F., a LHSV of about 1 to about 60 $hr.^{-1}$ and a hydrogen circulation rate of about 5000 SCFB to about 15,000 SCFB based on fresh charge stock.

From the foregoing embodiment, it will be noted that the improvement in hydrocarbon hydrocracking for the production of LPG, encompassed by the present invention, is specifically directed toward the composition of the catalytic composite.

Heretofore, it was believed, and the prior art so indicates, that only a relatively small percentage of mordenite was required to enhance the hydrocracking characteristics of a mordenite-alumina support material. Although it may be expected that those skilled in the art would attempt to adjust catalyst compositions and component percentages in the hope of finding an improved catalyst, such a person would not be able to accurately predict a complex correlation between a catalytic composition and its hydrocracking activity merely by varying the catalyst component percentages unless extensive experimental work had been performed. I not only have found that the hydrocracking activity of a mordenite containing alumina extruded catalyst may be substantially increased by increasing the mordenite content to a critical range but that the degree of activity does not bear a linear relationship to the quantity of alumina in the catalyst. Under the circumstances, a mordenite catalyst containing a narrow range percentage of alumina exhibits an unusually high hydrocracking activity which is completely unexpected.

The criticality of alumina concentration within the carrier material employed in the preparation of the catalytic composite is illustrated in the accompanying drawing. The data utilized in formulating the drawing were obtained in accordance with the specific example hereinafter set forth. Briefly, however, with reference to the drawing, data points 1, 2 and 3, through which curve 4 is drawn were obtained by processing a naphtha at constant conversion conditions, varying only the composition of the carrier material employed in preparing the catalytic composites. As indicated, the carrier material was, in all instances an extruded composite of mordenite and alumina, and each carrier material, following the formation thereof, was impregnated to give the finished catalyst a platinum concentration of 0.46 weight percent. It will be noted that an extruded mordenite catalyst containing from about 15 to about 40 weight percent alumina exhibits extremely good activity by requiring a relatively low reaction temperature to achieve the desired conversion. The criticality attached to the range of alumina composition of from about 15 to about 40 weight percent is readily ascertained by the character of the curve, in that an alumina concentration less than 15 percent or greater than 40 percent produces a catalytic composite which exhibits inferior activity which is, therefore, not well-suited for the production of LPG from higher boiling hydrocarbons.

The character of the curve in the drawing is unusual, and totally unexpected in view of the teachings of the prior art respecting the composition of the carrier material utilized in the preparation of catalytic composites suitable for utilization in the production of LPG. It has clearly been shown that the hydrocracking activity is not simply a matter of random adjustment of the composition of the carrier material, but that unexpected benefits arise as a result of utilizing a relatively narrow range of alumina in the catalytic composite.

As hereinbefore set forth, the process of the present invention is particularly directed to the processing of hydrocarbons and mixtures of hydrocarbons boiling below 600° F. Since the production of LPG is to be maximized, suitable charge stocks will include "gasoline boiling range hydrocarbons" having an initial boiling point of about 100° F. to about 125° F. and an end boiling point which may range from 350° F. to about 450° F., kerosene fractions and light gas oils boiling up to a temperature of about 600° F. These charge stocks may be isolated by well-known processing techniques from tar sand, shale and coal. The effluent streams from cokers, thermal crackers, fluid catalytic crackers, solvent extraction units, crude units, hydrocrackers, hydrodesulfurization units, visbreakers, and vapor recovery units may also supply hydrocarbons for these charge stocks.

Such charge stocks may be successfully processed even though trace quantities of sulfur are present. However, the hydrocarbon feed to be utilized in the present invention is preferably hydrotreated to essentially remove any sulfur or nitrogen which the feed may contain.

As indicated above, the catalyst of the present invention comprises a Group VIII metal component combined with an extruded support containing alumina and mordenite particles.

As is well known to those skilled in the art, mordenite is composed of a three-dimensional interconnecting network structure of silica and alumina tetrahedra. The tetrahedra are formed by four oxygen atoms surrounding a silicon or aluminum atom, and basic linkage between the tetrahedra are through the oxygen atoms. These tetrahedra are arranged in an ordered structure to form interconnecting cavities or channels of uniform size interconnected by uniform openings or pores. The ion-exchange property of mordenite follows from the trivalent nature of aluminum which causes the alumina tetrahedra to be negatively charged and allows the association of cations with them in order to maintain an electrical balance in the structure. The molecular sieve property of mordenite follows from the uniform size of the pores thereof which pores can be related to the size of molecules and used to remove from a mixture of molecules, the molecules having a critical diameter less than or equal to the diameter of the pore mouths. For purposes of the present invention, it is preferred to use mordenite having pore mouths of about 5 Angstroms in cross-sectional diameter and more preferably about 5 to about 15 Angstrom units. Ordinarily, mordenite is synthetically prepared in the alkali form with one alkali metal cation associated with each aluminium centered tetrahedron. The alkali metal cation may be thereafter ion-exchange with polyvalent cations such as calcium, magnesium, beryllium, rare earth cations, etc. Another treatment of alkali metal mordenite involves ion-exchange with ammonium ions followed by thermal treatment, preferably above 300° F. to convert to the hydrogen form. When the mordenite contains a high mole ratio of silica to alumina (for example, above 5) the material may be directly converted to an acid form in a suitable acid medium.

Although in some cases the polyvalent form of the mordenite may be used in the present invention, it is preferred to use the hydrogen form such as the alkali metal form, which is convertible to the hydrogen form during the course of the essential incorporation procedure discussed below.

The preferred mordenite for use in the present invention is the hydrogen and/or polyvalent forms of synthetically prepared mordenite. In fact, I have found best results with synthetic mordenite having an effective pore diamter of about 4 to about 6.6 Angstrom units and a mole ratio of silica to alumina of about 9 to 12. As is well known to those skilled in the art, mordenite differs from other known crystalline aluminosilicates in that its crystal structure is believed to be made-up of chains of five-member rings of tetrahedra which apparently are arranged to form a parallel system of channels having diameters of about 4 to 6.6 Angstroms interconnected by smaller channels having a diameter of about 2.8 Angstroms. Mordenite is characterized by the following formula:

$$0.9 \pm 2M_{2/n}O:Al_2O_3: X\ SiO_2 \text{ (anhydrous form)}$$

wherein M is a cation which balances the electrovalences of tetrahedra, $n$ is the valance of M, and X is a constant generally ranging in value from 9 to 11 and usually about 10. These synthetic mordenite type zeolites are available from a number of sources, one being the Norton Company of Worcester, Mass.

Regarding the method of incorporating the alumina particles into the mordenite support, it is an essential feature of the present invention that the alumina particles be uniformly distributed throughout the mordenite support. The most important advantage appears to be that there is a critical relationship between the mordenite and alumina particles which enables the resulting support to have unusual ability to catalyze reactions which depend on carbonium ion intermediates such as hydrocracking to $C_3$ and $C_4$ fragments.

Accordingly, it is an essential feature of the present invention that the catalyst thereof is produced by coextruding mordenite and alumina, said alumina comprising from about 15 to about 40 weight percent of resulting coextruded base and uniformly dispersed and said mordenite having a sodium content of less than about 5 weight percent as $Na_2O$ and having been treated with aqueous ammoniacal solution at a pH of at least 9.5.

The prior art has previously taught that ammoniacal solution treatment of inorganic oxide catalyst supports is useful to improve their physical characteristics. However, it has become known that a special ammoniacal treatment imparts improved activity to a mordenite containing catalyst.

Pursuant to the present invention, the mordenite is subjected to an aqueous ammoniacal treatment at a pH of at least about 9.5, and said treatment can be prior to coextrusion with alumina or after coextrusion therewith. The aqueous ammoniacal treatment can be effected at a temperature of from about 75° to about 200° C. over a period of from about 1 to about 24 hours. The treatment can be effected at substantially atmospheric pressure in an open vessel at about the reflux temperature of the aqueous ammoniacal solution albeit over a more extended period up to about 24 hours. The treatment is effective over a substantially shorter period, say from about 1 to about 10 hours at autogeneous pressures utilizing a closed vessel. Suitable ammoniacal solutions include solutions of bases such as ammonium hydroxide, hydroxylamine, hydrazine, tetramethylammonium hydroxide, etc., or strong organic amines like methylamine, dimethylamine, ethylamine, diethylamine, propylamine, diisopropylamine, n-butylamine, t-butylamine, diisobutylamine, n-amylamine, n-hexylamine, ethylene diamine, hexamethylene diamine, benzylamine, aniline, piperazine, piperadine, and the like, the selected base being employed in sufficient concentration to provide a pH of at least about 9.5 and preferably from about 10 to about 12.

The mordenite should contain, or should be treated to contain less than about 5 weight percent sodium calculated as $Na_2O$. The sodium can be reduced to an acceptable level by conventional and widely practiced ion-exchange techniques. Typically, ammonium cations are exchanged for sodium cations on treating the zeolite in contact with an aqueous ammonium salt solution, for example and aqueous ammonium chloride solution. The resulting ammonium exchanged mordenite is thereafter heat-treated to effect thermal decomposition of the ammonium cations and formation of the hydrogen form of the mordenite. In any case, the treatment may be effected one or more times to reduce the sodium content to less than about 5 weight percent calculated as $Na_2O$.

The alumina portion of the coextruded catalyst support may be any of the various hydrous aluminum oxides or alumina gels such as alpha-alumina monohydrate of the boehmite structure, alpha-alumina trihydrate of the gibbsite structure, beta-alumina trihydrate of the bayerite structure, and the like, the first mentioned alpha-alumina monohydrate being preferred.

A convenient method comprises commingling finely divided mordenite with finely divided alumina, adding a binder and/or lubricant to the mixture, and compressing or extruding the mixture into pills, pellets or extrudates of uniform size and shape. Alternatively, and still more preferably, the zeolite is mulled with a powdered form of the refractory inorganic oxide, and with a peptizing agent such as nitric acid, to form an extrudable dough. The dough can be pressured through a die of predetermined size to form extrudate particles utilized as such or rolled into spheres in a spinning drum prior to calcination. In any case, the zeolite can be subjected to the aqueous ammoniacal treatment herein contemplated either before being admixed with the refractory inorganic oxide or after being admixed therewith, the latter being preferred. The zeolite is preferably calcined in intimate admixture with the selected refractory inorganic oxide in a weight ratio of from about 1:3 to about 3:1.

Regardless of whether the zeolite is subjected to the aqueous ammoniacal treatment before or after admixture with refractory inorganic oxide, the treated zeolite is calcined in intimate admixture therewith to form a catalytic composite. Calcination is suitably in an air atmosphere at a temperature of from about 425° to about 750° C., preferably at a temperature of from about 475° to about 550° C., over a period of from about 0.5 to about 10 hours.

An essential component of the catalytic composite of the present invention is at least one metal from Group VIII including iron, cobalt, nickel, platinum, palladium, ruthenium, rhodium, osmium and iridium. The incorporation of the Group VIII component may be performed in any suitable manner and the prior art abounds with various techniques. It is the usual practice to deposit catalytically active metallic components on a support or carrier material by the method whereby a soluble compound of the desired metallic component is impregnated on the carrier material from an aqueous solution. The soluble compound serves as a precursor of the metallic component such that, upon subsequent heating of the impregnated carrier material at a temperature effecting decomposition of said compound, the desired metallic component is deposited on the carrier material. Suitable soluble compounds of Group VIII metals include nickel nitrate, nickel sulfate, nickel chloride, nickel bromide, nickel fluoride, nickel iodide, nickel bromide, nickel acetate, nickel formate, cobaltous nitrate, cobaltous sulfate, cobaltous fluoride, ferric fluoride, ferric bromide, ferric nitrate, ferric sulfate, ferric formate, ferric acetate, platinum fluoride, chloroplatinic acid, chloropalladic acid, palladium fluoride, etc. The Group VIII metal is effective in an amount comprising from about 0.1 to about 10 wt. % of the final catalyst composite.

Impregnation of the carrier material can be accomplished by conventional techniques whereby the carrier material is soaked, dipped, suspended or otherwise immersed in the impregnating solution at conditions to absorb a soluble compound comprising the desired catalytic component. Certain impregnating techniques have been found to be particularly favorable to promote the desired physical properties of the finished catalyst. The impregnation is preferably effected utilizing a minimal volume of impregnating solution commensurate with an even distribution of the catalytic component on the carrier material.

The impregnated carrier material is dried thereafter calcined in an oxygen-containing atmosphere at a temperature of from about 425° to about 815° C. in accordance with prior art practice, usually for a period of from about 1 to about 8 hours or more.

It is preferred that the resultant calcined dual function catalytic composite be subjected to reduction conditions prior to its use in the conversion of hydrocarbons. This step is designed to insure a uniform and finely divided dispersion of the Group VIII metal component throughout the carrier material. Preferably, substantially pure and dry hydrogen is used as the reducing agent in this step. The reducing agent is contacted with the calcined catalyst at a temperature of about 700° F. to about 1200° F. and a period of time of about 0.5 to 10 hours or more effective to substantially reduce the Group VIII metal component to its elemental state. This reduction treatment may be performed in situ as part of a start-up sequence if desired.

Although it is not essential, the resulting reduced dual-function catalyst is preferably subjected to a presulfiding operation designed to incorporate in the catalytic composite from about 0.05 to about 1.5 weight percent sulfur calculated on an elemental basis. Preferably, this presulfiding treatment takes place in the presence of hydrogen and a suitable sulfur-containing compound such as hydrogen sulfide, lower molecular weight mercaptans, organic sulfides, etc. Typically, this procedure comprises treating the reduced catalyst with a sulfiding gas such as a mixture of hydrogen and hydrogen sulfide having about 10 moles of hydrogen per mole of hydrogen sulfide at conditions sufficient to effect the desired incorporation of the sulfur component, generally including a temperature ranging from about 50° F. to about 1100° F. or more.

Both reduction and presulfiding of the catalyst may alternatively be performed simultaneously by contacting the calcined catalyst with a gas such as a mixture of hydrogen and hydrogen sulfide having about 10 moles of hydrogen per mole of hydrogen sulfide at conditions sufficient to effect the desired reduction and sulfiding, generally including a temperature ranging from about 50° F. to about 1100° F. or more.

According to the present invention, a hydrocarbon is contacted with a catalyst of the type described above in a hydrocarbon conversion zone at hydrocarbon conversion conditions. This contacting may be accomplished by using the catalyst in a fixed bed system, a moving bed system, a fluidized bed system, or in a batch type operation; however, in view of the danger of attrition losses of the valuable catalyst and of well known operational advantages, it is preferred to use a fixed bed system. In this system, the charge stock is preheated by any suitable heating means to the desired reaction temperature and then passed into a conversion zone containing a fixed bed of the catalyst type previously characterized. It is, of course, understood that the conversion zone may be one or more separate reactors with suitable means therebetween to insure that the desired conversion temperature is maintained at the entrance to each reactor. It is also to be noted that the reactant may be contacted with the catalyst bed in either upward, downward, or radial flow fashion. In addition, it is to be noted that the reactants may be in the liquid phase, a mixed liquid-vapor phase, or a vapor phase when they contact the catalyst with best results obtained in the vapor phase.

An effluent stream is withdrawn from the conversion zone and passed through a condensing means to a separation zone, typically maintained at about 50° to about 125° F., wherein a hydrogen-rich gas is separated from a LPG rich liquid product. Preferably, at least a portion of this hydrogen-rich gas is withdrawn from the separating zone and is then recycled through suitable compressing means back to the conversion zone. The liquid phase from the separating zone is then typically withdrawn and commonly treated in a fractionating system in order to recover LPG (i.e., liquefied petroleum gas) and other light ends.

The amount of alumina in the resulting mordenite support is preferably about 15 to about 40 weight percent thereof. By the expression "finely divided" it is meant that the alumina is used in a particle size having an average diameter of about 1 to about 100 microns, with best results obtained with particles of average diameter of less than 40 microns.

The catalyst utilized in the present invention may contain a halogen component. Although the precise form of the chemistry of the association of the halogen component with the mordenite-alumina support is not entirely known, it is customary in the art to refer to the halogen component as being combined with the mordenite-alumina support, or with the other ingredients of the catalyst. This combined halogen may be either fluorine, chlorine, iodine, bromine, or mixtures thereof. Of these, fluorine, and particularly chlorine are preferred for the purposes of the present invention. The halogen may be composited with the catalyst during the impregnation of the latter with the Group VIII metal component. In any event, the halogen component may be combined with the support in amounts sufficient to result in a final catalyst which contains about 0.01 to about 1.5 weight percent and preferably about 0.1 to about 1.0 weight percent halogen calculated on an elemental basis.

The following examples are given to further illustrate the process of the present invention and to indicate the benefits to be afforded through the utilization thereof.

EXAMPLE I

The data presented in this example is pertinent to the accompanying drawing, and the latter should be referred to in conjunction with the following discussion. The hydrocarbon utilized in the test procedure for this example for evaluating hydrocracking catalytic composites was a naphtha having a gravity, °API at 60° F., of 59.1, an initial boiling point of 210° F. and an end boiling point of 356° F. The naphtha contained 0.1 ppm sulfur and 9.7 volume percent aromatics. Catalyst portions in an amount of 100 cc. were employed in a reaction zone fabricated from stainless steel and were maintained under an imposed pressure of 1000 psig.

Naphtha was charged to the reaction zone at a rate sufficient to give a liquid hourly space velocity of 4.0 at a combined feed ratio (CFR) of 1.5, together with hydrogen in an amount of 10,000 scf/bbl. The reaction zone temperature was then slowly increased until conversion achieved 100% $C_5$-minus. The temperature required to obtain the desired conversion was an indication of the catalytic composite's activity, i.e., the lower reaction temperatures denoted the highest catalytic activity.

Three separate batches of mordenite-alumina supports were prepared, each containing 50 weight percent, 75 weight percent and 90 weight percent mordenite, respectively. Commercial mordenite (H Zeolon) containing about 0.16 weight percent sodium as $Na_2O$ and 16 weight percent volatile matter, as evidenced by weight loss on ignition at 900° C., was thoroughly dry-mixed with the required amount of a commercial alpha-alumina monohydrate (Kaiser medium) containing about 28% volatile matter. The dry-mixed mordenite and alumina were then admixed with nitric acid solution and mulled to form an extrudable dough. The resulting dough was extruded through a 1/16 inch die and broken to form extrudate particles. The extrudate was subsequently calcined in air at 500° C. for 1 hour. The calcined extrudate was then immersed in an aqueous solution of ammonium hydroxide containing about 5 weight percent $NH_3$ and having a pH of about 11.6. Five volumes of the aqueous ammoniacal solution were employed per volume of extrudate product treated. The treatment was conducted at atmospheric pressure conditions utilizing a glass flask with an overhead condenser and reflux temperature of about 90° C. over a 16 hour period. The treated material was subsequently water-washed, dried and calcined for 1 hour at 500° C.

A portion of each of the three batches of mordenite supports was impregnated with a solution containing chloroplatinic acid and HCl. After impregnation, the particles were then oxidized to produce a finished catalyst containing 0.46 weight percent platinum. The oxidized catalyst was then reduced and sulfided with a gaseous mixture containing about 10 moles of $H_2$ and 1 mole of $H_2S$ at a temperature of about 775° F.

The three finished catalysts were then subjected to the activity test procedure hereinabove described. The following Table I indicates the catalyst designation (having reference to the datum points of the accompanying drawing), the quantity of alumina in the carrier material, and the reaction zone temperature above base required to achieve 100% $C_5$-minus conversion.

TABLE I

| Evaluation of Hydrocracking Activity | | | |
|---|---|---|---|
| Catalyst No. | 1 | 2 | 3 |
| Mordenite Concentration, wt. % | 50 | 75 | 90 |
| Reaction Zone Temperature Above Base Required for 100% C₅-minus Conversion, ° C. | 18 | 10 | 45 |

From the data presented in foregoing Table I and with reference to the accompanying drawing, it will be seen that the three catalysts, having increasing concentrations of mordenite in the mordenite-alumina carrier material, the latter ranging from 50 to 90 percent by weight, did not produce increasing hydrocracking activities. This is clearly brought out upon comparing the results obtained through the use of catalysts 1, 2 and 3. These data were employed in preparing curve 4 of the drawing, which curve clearly illustrates the criticality attached to an alumina concentration within the range of about 15 to about 40 percent by weight and ipso facto the mordenite concentration, which is about 85 weight to about 60 weight percent, in order to minimize the temperature required to perform a 100% conversion of the feedstock to C₅-minus.

EXAMPLE II

The hydrocarbon utilized in the test procedure for this example for evaluating hydrocracking catalytic composites was a naphtha having a gravity, °API at 60° F., of 54.3, an initial boiling point of 210° F. and an end boiling point of 356° F. The naphtha contained 0.1 ppm sulfur and 13.5 volume percent aromatics. Catalyst portions in an amount of 100 cc. were employed in a reaction zone fabricated from stainless steel and were maintained under an imposed pressure of 1000 psig.

Naphtha was charged to the reaction zone at a rate sufficient to give a liquid hourly space velocity of 4.0 at a combined feed ratio (CFR) of 1.5, together with hydrogen in an amount of 10,000 scf/bbl. The reaction zone temperature was then slowly increased until conversion achieved 100% C₅-minus. The temperature required to obtain the desired conversion was an indication of the catalytic composite's activity, i.e., the lower reaction temperatures denoted the highest catalytic activity.

A batch of mordenite-alumina supports were prepared which contained 75 weight percent alumina and 25 weight percent mordenite. Again, commercial mordenite (H Zeolon) containing about 0.16 weight percent sodium as Na₂O and 16 weight percent volatile matter was thoroughly dry-mixed with the required amount of a commercial alpha-alumina monohydrate (Kaiser medium) containing about 28% volatile matter. The dry-mixed mordenite and alumina were then admixed with nitric acid solution and mulled to form an extrudable dough. The resulting dough was extruded through a 1/16 inch die and broken to form extrudate particles. The extrudate was subsequently calcined in air at 500° C. for 1 hour.

A portion of the calcined extrudate was immersed in an aqueous solution of ammonium hydroxide containing about 5 weight percent NH₃ and having a pH of about 11.6. Five volumes of the aqueous ammoniacal solution were employed per volume of extrudate treated. The treatment was conducted at atmospheric pressure conditions utilizing a glass flask with an overhead condenser and reflux temperature of about 90° C. over a 16 hour period. The treated material was subsequently water-washed, dried and calcined for 1 hour at 500° C. The calcined support was impregnated with a solution of chloroplatinic acid and HCl. After impregnation, the particles were then oxidized to produce a finished catalyst containing 0.46 weight percent platinum. The oxidized catalyst was then reduced and sulfided with a gaseous mixture containing about 10 moles of H₂ and 1 mole of H₂S at a temperature of about 775° F. The resulting sulfided catalyst was subjected to the activity test procedure hereinabove described in the present example. In order to achieve a 100% C₅-minus conversion, a reaction zone temperature 36° C. above base temperature was required and the results of this test are presented in Table II. The base temperature hereinabove referred to is identical to that of Example I.

Another portion of the calcined extrudate was not treated with an ammoniacal solution but impregnated with a solution of chloroplatinic acid and HCl. The finishing of the catalyst was performed in exactly the same manner as the previous catalyst. The resulting impregnated and sulfided catalyst containing 0.46 weight percent platinum was also subjected to the activity test procedure hereinabove described in the present example. Although the reaction zone temperature was to increase to more than 100° C. above the base temperature, 100% C₅-minus conversion was never achieved. The results of this test are also presented in Table II.

TABLE II

| Evaluation of Hydrocracking Activity | | |
|---|---|---|
| | Ammonium Treatment | |
| Catalyst Identity | With | Without |
| Alumina Concentration, wt. % | 75% | 75% |
| Reaction Zone Temperature Above Base Required for 100% C₅-minus Conversion, ° C. | 36 | * |

*100% Conversion was not achieved

The foregoing specification and examples clearly illustrate the improvements encompassed by the present invention and the benefits to be afforded a process for the production of LPG from higher-boiling hydrocarbon charge stock.

I claim as my invention:

1. A hydrogen-consuming process for selectively producing LPG from a hydrocarbon charge stock boiling below about 600° F., which comprises contacting said charge stock and hydrogen with a catalyst comprising a Group VIII metal component combined with an extruded mordenite-alumina carrier material containing a uniform distribution of about 15 to about 40 weight percent of finely divided alumina particles, said mordenite being present in the range of about 85 to about 60 weight percent based on the total weight of said carrier material and having been treated to reduce the sodium content to less than about 5 weight percent Na₂O and subsequently having been treated with an aqueous ammoniacal solution at a pH of at least about 9.5, at hydrocracking conditions including a pressure of about 300 to about 1800 psig., a temperature of about 600° F. to about 850° F., a LHSV of about 1 to about 60 hr.⁻¹ and a hydrogen circulation rate of about 5000 SCFB to about 15,000 SCFB based on fresh charge stock.

2. The process of claim 1 further characterized in that said Group VIII metal component is platinum or a platinum compound.

3. The process of claim 1 further characterized in that said Group VIII metal component is palladium or a palladium compound.

4. The process of claim 1 further characterized in that said Group VIII metal component is present in an amount from about 0.05 to about 1.5 weight percent.

5. The process of claim 1 further characterized in that said catalyst contains about 0.05 to about 1.5 weight percent halogen.

6. The process of claim 1 further characterized in that said catalyst contains about 0.1 to about 1.5 weight percent sulfur.

* * * * *